US009235816B2

(12) United States Patent
Bastian

(10) Patent No.: US 9,235,816 B2
(45) Date of Patent: Jan. 12, 2016

(54) SYSTEM AND METHOD FOR FACILITATING PERFORMANCE VENUE SEAT SELECTION

(75) Inventor: Geannie M. Bastian, Altamonte Springs, FL (US)

(73) Assignee: Geannie M. Bastian, Altamonte Spgs, FL (US)

( * ) Notice: Subject to any disclaimer, the term of this patent is extended or adjusted under 35 U.S.C. 154(b) by 1668 days.

(21) Appl. No.: 12/420,311

(22) Filed: Apr. 8, 2009

(65) Prior Publication Data

US 2009/0256839 A1 Oct. 15, 2009

Related U.S. Application Data

(60) Provisional application No. 61/043,712, filed on Apr. 9, 2008.

(51) Int. Cl.

| G06T 15/00 | (2011.01) |
|---|---|
| G06T 17/00 | (2006.01) |
| G06F 17/50 | (2006.01) |
| G06Q 10/00 | (2012.01) |
| G06F 3/00 | (2006.01) |
| G06F 3/048 | (2013.01) |
| G06Q 10/02 | (2012.01) |
| G06T 19/00 | (2011.01) |
| G06T 17/20 | (2006.01) |
| G06T 15/20 | (2011.01) |
| G06Q 30/06 | (2012.01) |

(52) U.S. Cl.
CPC ............ *G06Q 10/02* (2013.01); *G06Q 30/0601* (2013.01); *G06T 15/20* (2013.01); *G06T 17/20* (2013.01); *G06T 19/00* (2013.01)

(58) Field of Classification Search
CPC ......... G06T 19/00; G06T 17/20; G06T 15/20; G06Q 10/02; G06Q 30/0601; H04N 7/17318; G06F 17/50; G06F 3/04815
USPC .................... 345/419, 420, 427; 703/1; 705/5
See application file for complete search history.

(56) References Cited

U.S. PATENT DOCUMENTS

| 5,333,257 | A | * | 7/1994 | Merrill et al. ................. 345/467 |
| 6,124,862 | A | * | 9/2000 | Boyken .................... G06T 7/20 |
| | | | | 345/419 |
| 2005/0131658 | A1 | * | 6/2005 | Mei et al. ........................ 703/1 |
| 2006/0232605 | A1 | * | 10/2006 | Imamura ...................... 345/619 |
| 2007/0265892 | A1 | | 11/2007 | Valentino |

FOREIGN PATENT DOCUMENTS

| JP | 05324689 | 12/1993 |
| KR | 20020063768 | 8/2002 |

OTHER PUBLICATIONS

International Search Report and Written Opinion of the Searching Authority mailed Nov. 11, 2009. Entire document.

* cited by examiner

*Primary Examiner* — Ke Xiao
*Assistant Examiner* — Andrew Shin

(57) ABSTRACT

Seat selection for prospective spectators at a performance venue is facilitated by displaying virtual views of the performance space from any selected seat. The virtual seat views can be photorealistic renderings based on a three dimensional digital model of the performance venue. The virtual seat views can also reflect the seat locations as well as estimated spectator heights of eye.

13 Claims, 4 Drawing Sheets

SYSTEM AND METHOD FOR FACILITATING PERFORMANCE VENUE SEAT SELECTION

CROSS-REFERENCE TO RELATED APPLICATION

This application claims the benefit of U.S. Provisional Application Ser. No. 61/043,712, filed on Apr. 9, 2008, the contents of which are hereby incorporated by reference in their entirety.

FIELD OF THE INVENTION

The present invention relates to seat selection for performance venues, and more particularly, to systems and methods offering representations of performance venues to assist in seat selection.

BACKGROUND OF THE INVENTION

Many performance venues, such as theaters and sports arenas, allow prospective spectators to reserve seats in advance. Oftentimes, the advance reservation of seats is a practical necessity, as the performance venue will be quickly sell out of available seats. Increasingly, the reservation of seats in advance (most typically in the form of advance ticket purchases) is accomplished remotely from the performance venue. For instance, many reservations are made over the Internet. Additionally, electronic ticket kiosks are also frequently used. Even if seats are reserved in advance at a performance venue box office, it may not be possible to physically view the venue at the time reservations are made.

In an attempt to facilitate seat selection, many reservation systems will display a seating chart of the performance venue. A typical seating chart shows block representations of the seats and may generally indicate the location of the performance space, such as a stage, court or field. These seating charts are often not to scale, and even when they are, they ordinarily fail to represent more than the general location of the seats.

SUMMARY OF THE INVENTION

In view of the foregoing, it is an object of the present invention to provide an improved system and method for facilitating performance venue seat selection. According to an embodiment of the present invention, a system for facilitating seat selection for a performance venue having a performance space and a plurality of seats includes at least one computer, including a processor and machine readable memory. The computer executes a venue modeling module configured to generate a three-dimensional digital model of the performance venue, an image rendering module configured to generate a plurality of virtual views of the performance space corresponding to the plurality of seats, and an image database of the plurality of views indexed by the plurality of seats.

According to an aspect of the present invention, the system further comprises a seat selection assistance module configured to selectively display the plurality of views from the image database to prospective spectators.

According to a method aspect of the present invention, a method for facilitating seat selection for a performance venue having a performance space and a plurality of seats includes receiving selections of the plurality of seats from prospective spectators, and displaying a plurality of virtual views of the performance space from the plurality of seats selected.

According to additional aspects of the present invention, the method further includes generating the plurality of virtual views from a three dimensional digital model of the performance venue. The locations of the seats can be automatically determined from the digital model, and spatial coordinates can be identified for the seats and estimated heights of eye above the seats for spectators using the seats.

The present invention can greatly facilitate seat selection by allowing a prospective spectator to virtually "see" what the view will be like from any seat, taking into account physical features of the performance venue that are not depicted on a seating chart. As a result, prospective spectators can be more confident in selecting a seat and may be more likely to actually make a reservation. Additionally, prospective spectators may be encouraged to select better seats.

These and other objects, aspects and advantages of the present invention will be better appreciated in view of the drawings and following detailed description of a preferred embodiment.

DETAILED DESCRIPTION OF A PREFERRED EMBODIMENT

Figure 1:
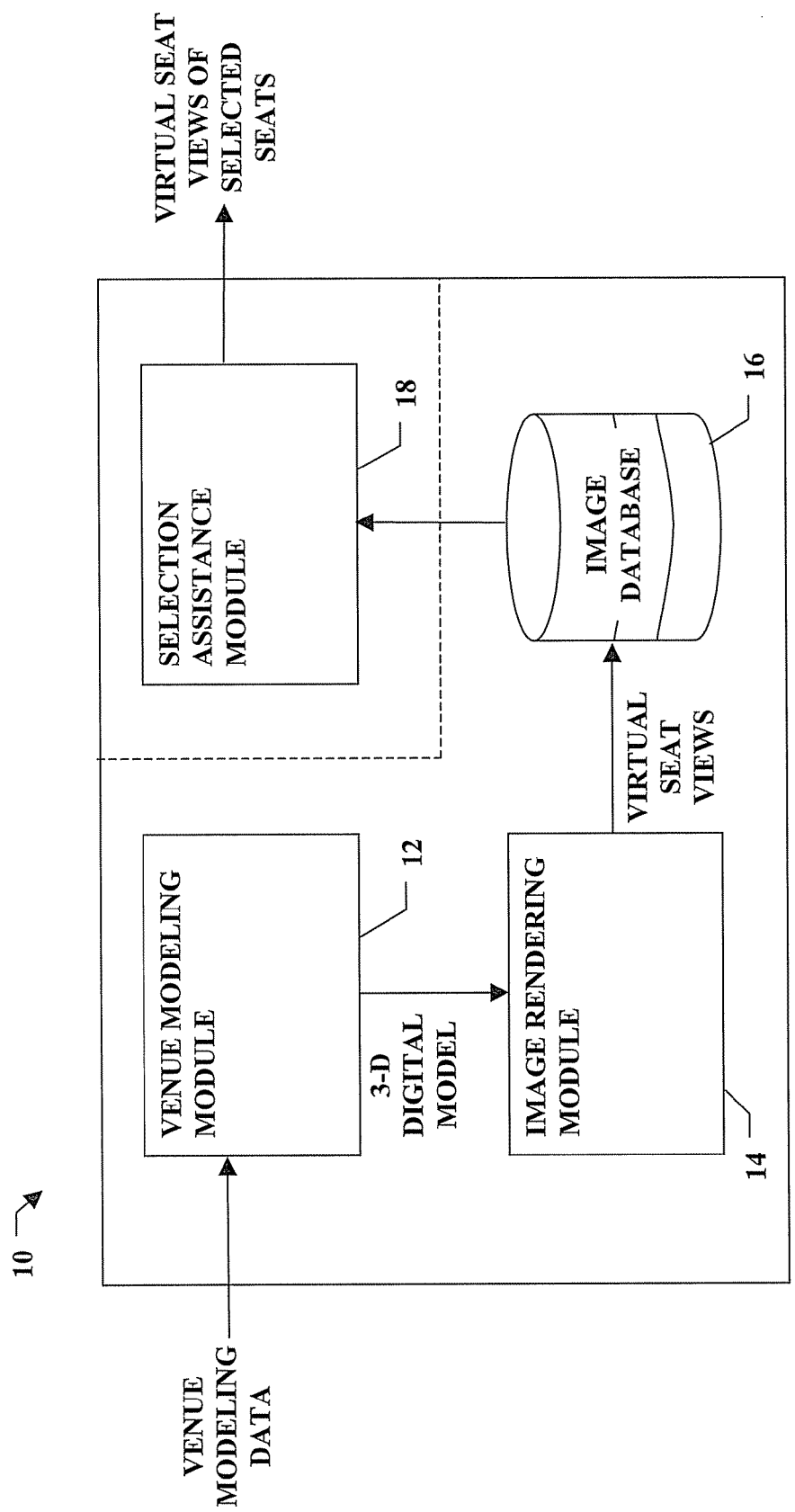
FIG. 1 is a schematic overview of a system for facilitating seat selection for a performance venue, according to an embodiment of the present invention.

Referring to FIG. 1, according to an embodiment of the present invention, a system 10 for facilitating seat selection for a performance venue includes at least one computer having a processor and machine readable memory executing a venue modeling module 12, an image rendering module 14, an image database 16 and a selection assistance module 18. The present invention is not necessarily limited to any particular number, type or complexity of computer, processor or machine readable memory. Multiple computers can be used to execute the various modules. For instance, the selection assistance module 18, is preferably executed by one or more computers remote from the computer executing the venue modeling module 12, image rendering module 14, and image database 16.

As used herein, a "performance venue" can include any location of a scheduled event to be viewed by spectators. Non-limiting examples of performance venues include theaters, stadiums, arenas, halls and auditoriums. A performance venue includes a plurality of seats and a performance space. As used herein, a "seat" can include any pre-defined viewing location within a performance venue, and does not necessarily require a physical seat. Non-limiting examples of seats include chairs, benches, drive-in theater parking spots and score desks. As used herein, a "performance space" can include any location within a performance venue where the scheduled event to be viewed will primarily occur. Non-limiting examples of performance spaces include stages, fields and courts.

The venue modeling module 12 is configured to generate three dimensional (3-D) digital models of performance venues. The digital models are preferably highly detailed to allow for photorealistic rendering, as described further below. The digital models can be developed directly with a computer-aided drafting (CAD) application or other digital modeling application, but are preferably generated automatically from venue modeling data. The venue modeling data 24 can include, for example, the output of a 3-D scanning process.

The image rendering module 14 is configured to generate a plurality of virtual views of the performance space corresponding to the plurality of seats, based on the digital model generated by the venue modeling module 12. The image rendering module 14 is preferably configured to automatically identify seat locations in the digital model and determine spatial coordinates for one or more heights of eye for an average spectator at each seat location, and determine the virtual views of the performance space based thereon.

The virtual seat views preferably include static views of the performance space, as seen from each of the spatial coordinates associated with the heights of eye, as well as animated views of a progression to the corresponding seat (herein referred to as "fly-in views"). The image rendering module 14 is preferably further configured to generate photorealistic renderings of the virtual seat views.

The image database 16 stores the virtual seat views, indexed by seat and performance venue, for later access by the selection assistance module 18. Where a computer remote from the image database 16 executes the selection assistance module 18, the virtual seat views can be communicated over a network, such as the Internet. Alternately, the virtual seat views can be transferred to the selection assistance module 18 on portable memory media, such as flash memory drives, hard drives, compact discs and digital video discs.

The selection assistance module 18 is configured to allow prospective spectators to select from among the seat locations for one or performance venues and to display the corresponding virtual seat view(s) based upon the seat locations selected. The selection assistance module 18 can be further configured to allow the prospective spectators to reserve available seats for a scheduled event. Advantageously, a plurality of selection assistance modules 18 are executed on separate computers, for instance, on computers controlled by different performance venues or ticket retailers.

Figure 2:
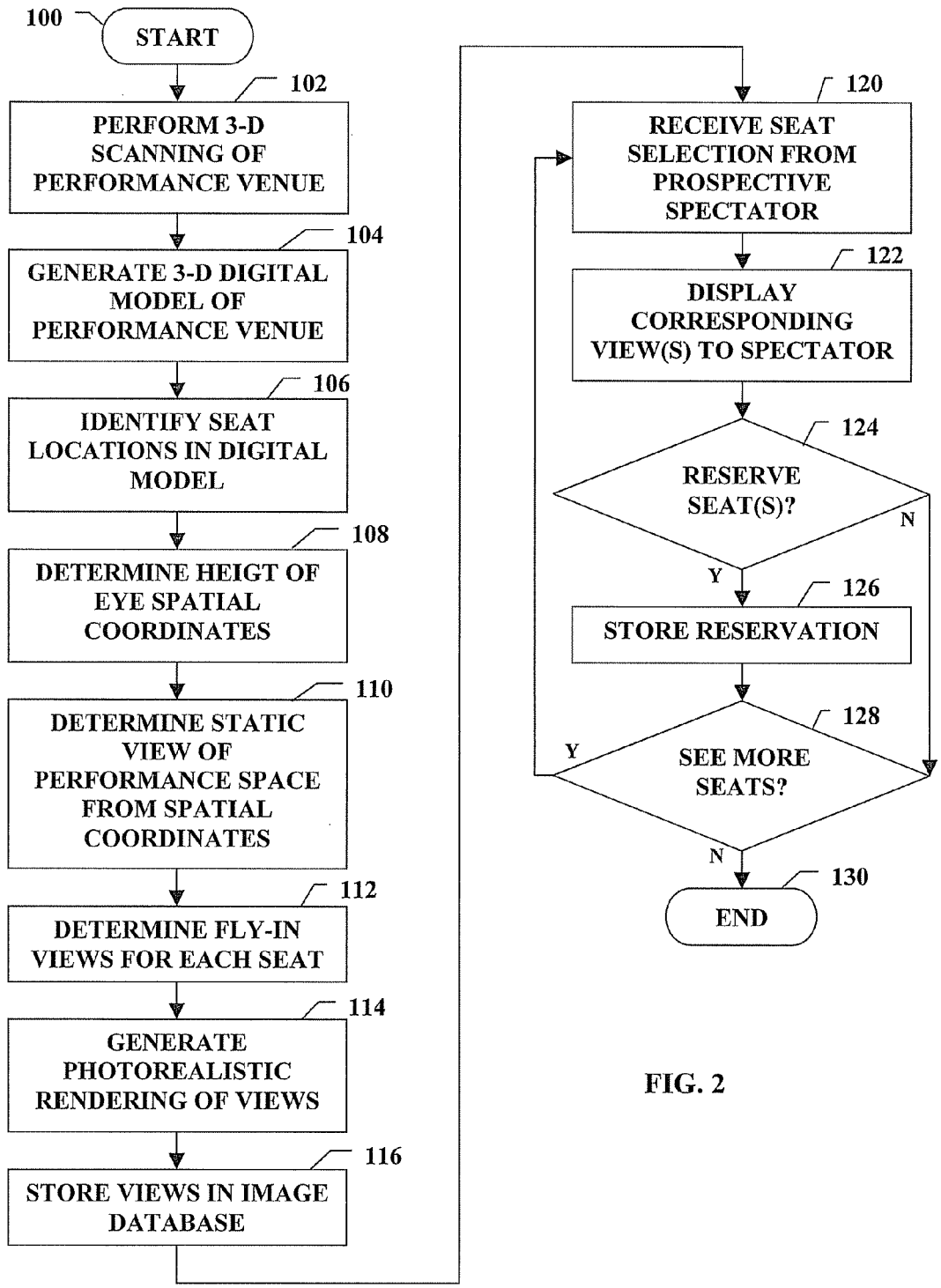
FIG. 2 is a flow diagram of a method for facilitating seat selection for a performance venue, according to a method aspect of the present invention.

Referring to FIG. 2, additional functions of the system 10, as well as additional aspects of the present invention, will be further understood in view of the following description of a method of facilitating seat selection for a performance venue. The method begins at block 100. At block 102, 3-D scanning of a performance venue is accomplished. As discussed above, 3-D scanning of the performance venue is not necessarily required, but can greatly facilitate generation of the 3-D digital model.

The present invention is not necessarily limited to a particular type of 3-D scanning. However, non-limiting examples of suitable 3-D scanning techniques include time-of-flight and triangulation active laser scanning, and stereoscopic and photometric passive scanning. A point cloud is a non-limiting example of a suitable 3-D scanning process output.

At block 104, the 3-D digital model of the performance venue is generated. In the current example, the digital model is generated based on the output of the 3-D scanning process using, for instance, a CAD, or other modeling, application.

At block 106, the seat locations are identified in the digital model. Identification of the seat locations is preferably accomplished automatically. For example, certain feature groupings within the digital model can be identified as corresponding to a seat location. Using those feature groupings, the rest of the seat locations can be automatically detected. Although automatic seat location identification is preferred, seat locations can also be separately identified by an individual.

Advantageously, a particular component or portion of each seat can be particularly identified, such as, in the case of an actual chair, the top of the seating surface. The spatial coordinates of each seat, or portion thereof, are then known. The spatial coordinates can be expressed, for instance, as 3-D Cartesian coordinates or 3-D polar coordinates.

At block 108, the spatial coordinates associated with estimated heights of eye of spectators are determined. The height of eye is determined to account for the difference between the location of the seat and where a spectator's eyes are likely to be located when using that seat. The height of eye coordinates can be determined by, for example, adding a predetermined vertical displacement to the spatial coordinates associated with each seat. Advantageously, more than one height of eye is determined for each seat. For instance, spatial coordinates corresponding to an average child height of eye and an average adult height of eye are both determined.

At block 110, the contents of a static view of the performance space from the spatial coordinates corresponding to heights of eye is determined for each seat. For example, sight lines are applied to the digital model from each of the spatial coordinates and calculations are performed to determine what digital model features are included in each static view.

Additionally, at block 112, the content of one or more fly-in views can be determined for each seat. A fly-in view can offer a prospective spectator a better feel for the relative position of a given seat within the performance venue. For example, a fly-in view can proceed between the performance space and the seat, allowing a better sense of the distance from the performance space to the seat. Another fly-in view could proceed between an entrance to the performance venue to the seat, allowing a better sense of any physical challenges that may be associated with accessing the seat.

At block 114, the virtual seat views determined from the digital model are rendered photorealistically using a graphics rendering engine. The present invention is not necessarily limited to a particular graphics rendering engine, but examples of suitable graphics rendering engines include those sold under the trademarks POV-Ray, 3D Studio and Ogre. It will be appreciated, however, that many advantages of the present invention can also be realized without photorealistic rendering.

At block 116, the rendered virtual seat views are stored in an image database, indexed by the performance venue and seat locations. As will be described in detail below, the virtual seat views are then available for selective display to prospective spectators to facilitate seat selection. It will be appreciated that the present invention, rather than pre-generating and storing all desired virtual seat views for subsequent selection could also generate/render views upon selection by a prospective purchaser. It will be further appreciated that blocks 102-116 can be repeated as necessary to generate/re-generate virtual seat views for the same or other performance venues If desired, performance space variable elements, for example, set pieces in a stage production, can be added to the digital model and incorporated into the virtual seat views. The incorporation of the variable elements can allow the producers of a given event a better idea of how the variable elements will appear in the performance venue and add to, or detract from, the overall experience. Some or all of the variable elements could also, but need not, be included in the virtual seat views shown to prospective spectators, for an enhanced sense of a seat's view for a particular event.

Figure 3:
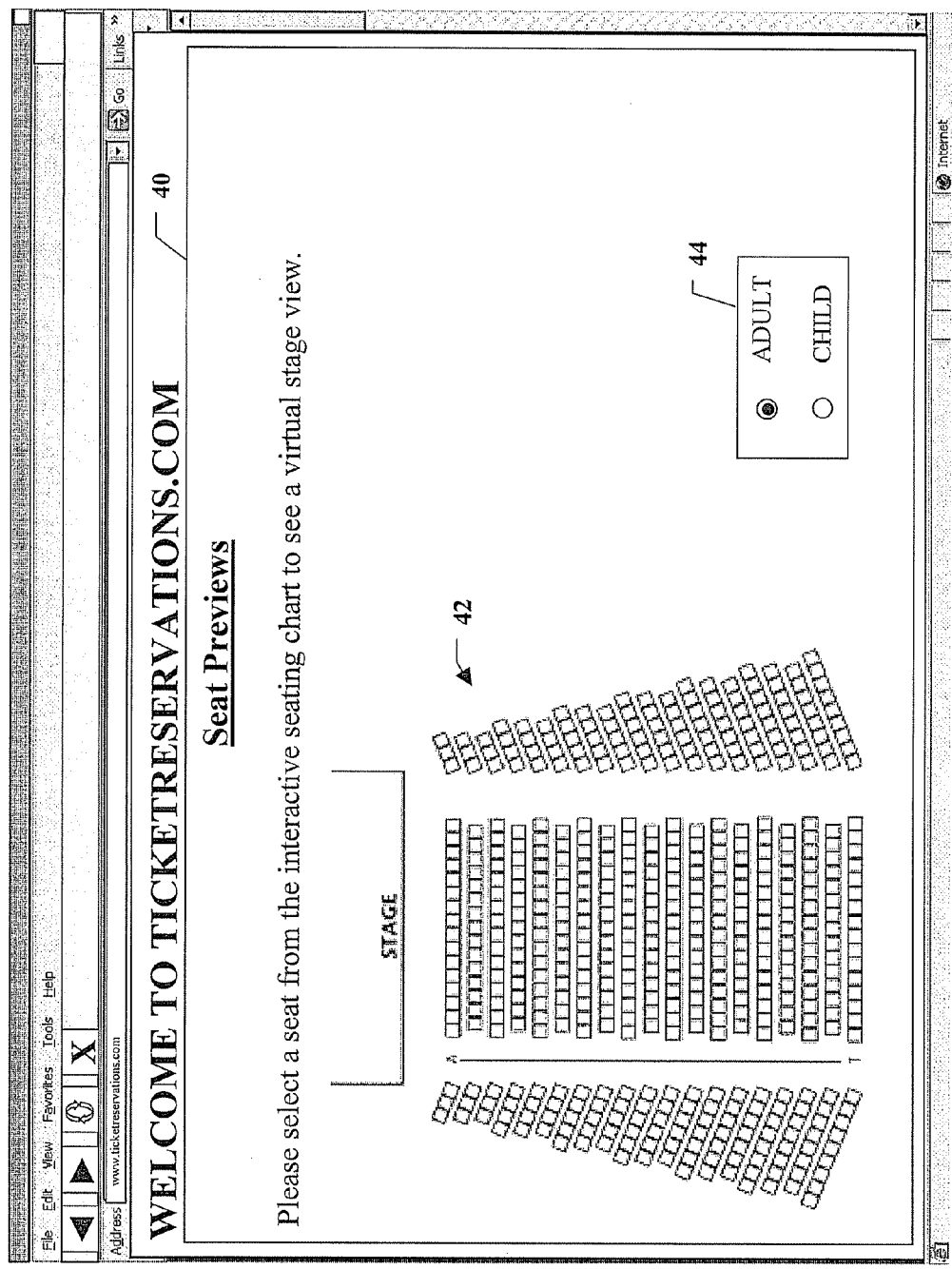
FIGS. 3 and 4 are exemplary screen views displayed to a prospective spectator in connection with the method of FIG. 2.

At block 120, a seat selection is received from a prospective spectator for a particular event scheduled for a particular performance venue. This selection can be received using a graphical user interface (GUI) designed for user-friendliness and compatibility with the virtual seat views. For example, referring to FIG. 3, in an exemplary seat preview screen 40, an interactive seating chart 42 and point-of-view selection 44 can be displayed to the spectator. To see the view(s) associated with a particular seat, the prospective spectator can simply select a particular seat from the chart 42. Advantageously, the interactive seating chart can indicate (for instance, by shading or coloring) which seats remain available for the particular event. Additionally, the prospective spectator can be enabled to select more than one seat at a time.

As used herein, a "prospective spectator" can include any individual or entity assessing seats available for reservation. The prospective spectator need not plan on actually viewing the event. For instance, a hotel concierge could be a prospective spectator, even though the concierge may be reviewing available seat on behalf of one or more other people.

Figure 4:
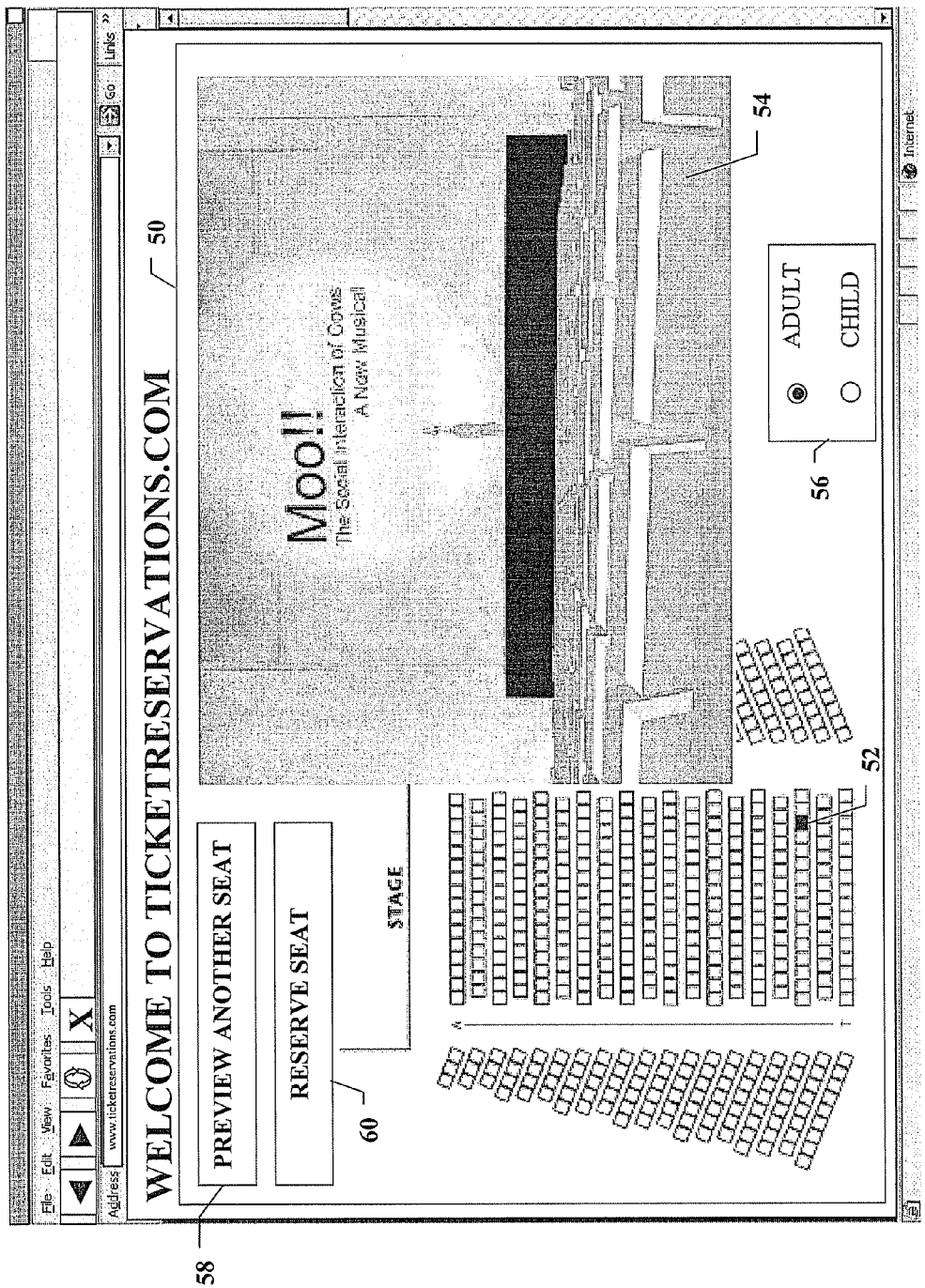

Referring again to FIG. 2, at block 122 the corresponding virtual seat views are displayed to the prospective spectator. Referring to FIG. 4, in an exemplary view display screen 50, the virtual view of the performance space from the selected seat 52 is displayed in a view window 54. If the prospective spectator has selected more than one seat, views of the other seats can be scrolled through. Additionally, the prospective spectator can be given an option to scroll to the next available seat that was not specifically selected. As described above, one or more fly-in views can also be shown in addition to the static view seen in FIG. 4. A point of view selection 56 can be used to switch the displayed view between different heights of eye.

Referring again to FIG. 2, at block 124, it is determined if the prospective spectator wishes to reserve the selected seat (s), using, for example, selection 58 of FIG. 4. At block 126, if the seat(s) is/are to be reserved, the reservation is stored. The corresponding seat(s) is/are then indicated as being unavailable to subsequent prospective spectators for that event at that performance venue.

At block 128, it is determined if the prospective spectator desires to preview one or more additional seats, for instance, using the selection 60 of FIG. 4. The more seats are to be previewed, the method returns to block 120. Otherwise, the method ends at block 130. It will be appreciated that the steps of blocks 120-130 can be repeated as necessary to accommodate the needs of additional prospective spectators.

Additionally, blocks 120-130 have been described in the context of the selecting seats for a particular event at a particular venue. It will be further appreciated that blocks 120-130 can be repeated as necessary to facilitate seat selection at other events and/or other performance venues. Advantageously, blocks 120-130 can be accomplished using one or more network-based computers connected to the Internet and/or one more computers associated with automated kiosks at box offices or other ticket sale locations.

From the foregoing, it will be appreciated that the present invention offers substantial advantages over current seating charts. For example, in the context of a stage production, the system and method of the present invention allow a greatly enhanced sense of the distance between a given seat and the stage, as well as the perspective/angle of the stage from a given seat. Additionally, physical obstructions that may affect the view from a given seat can also be appreciated. For instance, the impact of the view onto a deep stage from an extreme side seat, or the impact of a pillar or other support on a given seat, can be better seen.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A method for facilitating seat selection for a performance venue having a performance space and a plurality of seats, the method comprising:
   generating a three-dimensional digital model of the performance venue;
   identifying a plurality of spatial coordinates corresponding to the plurality of seats within the digital model;
   generating a plurality of views of the performance space corresponding to the plurality of spatial coordinates; and
   selectively displaying the plurality of views to prospective spectators;
   wherein the plurality of spatial coordinates identified include, for each of the plurality of seats, a plurality of eye heights, said plurality of eye heights including an average adult height of an eye of a seated adult viewer and an average child height of an eye of a seated child viewer;
   and wherein the plurality of views of the performance space generated include, for each of the plurality of spatial coordinates, a static view of the performance space and a fly-in view between the corresponding seat and the performance space.

2. The method of claim 1, wherein the generating the three-dimensional model of the performance venue includes performing three-dimensional scanning of the performance venue.

3. The method of claim 1, wherein identifying the spatial coordinates corresponding the plurality of seats within the digital model includes automatically identifying seat locations from the digital model.

4. The method of claim 1, wherein generating the plurality of views of the performance space corresponding to the plurality of spatial coordinates includes generating photorealistic renderings of the plurality of views.

5. The method of claim 1, wherein selectively displaying the plurality of views to prospective ticket acquirers includes displaying an interactive map of the performance venue with the plurality of seats to the prospective ticket acquirers, and displaying the plurality of views corresponding to the plurality of seats selected from the interactive map.

6. A system for facilitating seat selection for a performance venue having a performance space and a plurality of seats, the system comprising:
   at least one computer, including a processor and machine readable memory, executing:
      a venue modeling module configured to generate a three-dimensional digital model of the performance venue;
      an image rendering module configured to generate a plurality of virtual views of the performance space corresponding to the plurality of seats; and
      an image database of the plurality of views indexed by the plurality of seats;
   wherein the image rendering module is further configured to determine, for each of the plurality of seats, the plurality of virtual views corresponding to a plurality of eye heights including an average adult height of an eye of a seated adult viewer and an average child height of an eye of a seated child viewer.

7. The system of claim 6, further comprising a seat selection assistance module configured to selectively display the plurality of views from the image database to prospective spectators.

8. The system of claim 7, wherein the seat selection assistance module is executed by another computer.

9. The system of claim 6, wherein the image rendering module is further configured to automatically identifying seat locations from the digital model.

10. The system of claim 6, wherein the image rendering model is further configured to generate, for each of the plurality of seats, a static view of the performance space and a fly-in view.

11. A method for facilitating seat selection for a performance venue having a performance space and a plurality of seats, the method comprising:
   receiving selections of the plurality of seats from prospective spectators; and
   displaying a plurality of virtual views of the performance space from the plurality of seats selected;
   wherein the virtual views, for each selected seat, includes a respective view from a plurality of eye heights, including a respective view from an average adult height of an eye of a seated adult viewer in the selected seat and an average child height of an eye of a seated child viewer in the selected seat.

12. The method of claim 11, further comprising generating the plurality of virtual views from a three dimensional digital model of the performance venue.

13. The method of claim 12, further comprising generating the three dimensional digital model.

* * * * *